Patented June 23, 1942

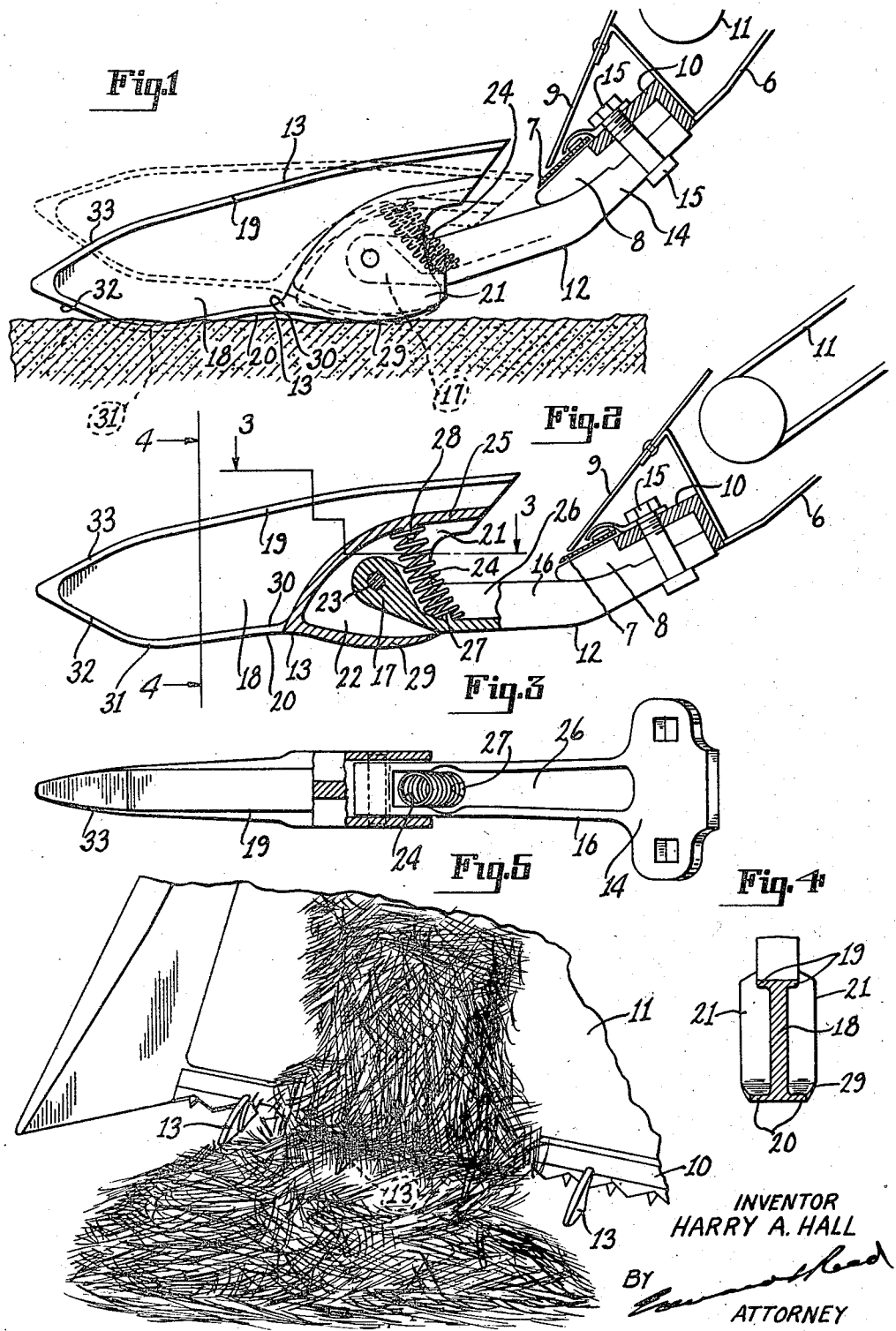

2,287,304

UNITED STATES PATENT OFFICE 2,287,304

PICKUP DEVICE

Harry A. Hall, Morral, Ohio

Application February 21, 1941, Serial No. 379,967

2 Claims. (Cl. 56—312)

This invention relates to a pick-up device for use on grain harvesters and is designed more particularly for use on that type of harvester known as a "combine," which is adapted to both cut and thresh the grain and in which the cutter bar is inclined downwardly and forwardly with relation to the ground level, usually at an angle of about forty-five degrees. In harvesting certain seed crops, such as clover, alfalfa, legumes and the like, all of which are herein included in the term "grain," it is customary to first mow the grain and then permit the grain to dry in the swath and to thereafter gather the dry grain from the swath by a combine and thresh the same in the combine. However, the combine is designed to operate on standing grain and does not operate efficiently to gather dry grain from the swath, but fails to pick up much of the grain.

Pick-up devices have heretofore been provided for use on ordinary harvesters and mowing machines, in which the cutter bars have little or no forward inclination but are substantially parallel with the ground level, but these prior devices have been of such a character that they could not be mounted in an operative position on the inclined cutter bar of a combine and even if modified to enable them to be mounted on an inclined cutter bar they would not operate satisfactorily and would not efficiently pick up dry grain from the swath.

One object of the invention is to provide a pick-up device which can be mounted on the inclined cutter bar of a combine and will operate efficiently when so mounted.

A further object of the invention is to provide such a device which will operate efficiently to pick up dry grain from the swath as well as to pick up uncut grain which has fallen.

A further object of the invention is to provide such a device which will have a relatively large range of pivotal movement to enable it to accommodate itself to uneven ground surfaces and to ride over minor obstructions and will at the same time guide the grain across the cutter bar.

A further object of the invention is to provide such a device which will in no way interfere with the operation of the combine in harvesting standing grain.

A further object of the invention is to provide such a device which will be simple in construction and operation and inexpensive to manufacture, and which can be easily and quickly attached to and removed from the cutter bar.

Other objects of the invention may appear as the device is described in detail.

In the accompanying drawing Fig. 1 is a side elevation of a pick-up device embodying my invention, showing the same attached to the inclined cutter bar of a combine and in operative engagement with the ground; Fig. 2 is a side elevation of the pick-up device, partly in section, and showing the cutter bar in an elevated position with the pick-up device supported out of engagement with the ground; Fig. 3 is a plan view of the pick-up device, partly in section on the line 3—3 of Fig. 2; Fig. 4 is a transverse section taken on the line 4—4 of Fig. 2, looking in the direction of the arrows; and Fig. 5 is a perspective view of portions of the cutter bar and conveyor of a combine, showing the cutter bar provided with a plurality of pick-up devices.

In this drawing I have illustrated the preferred form of the invention and have shown the same in connection with the cutter bar of a combine of a well known type but it will be understood that the invention may take various forms and may be applied to harvesters of various kinds.

In the ordinary combine the cutter bar 10 is mounted on the lower portion of an inclined supporting structure 6 and carries the knife or sickle 7 and the knife guards 8. A shield 9 extends across the cutter bar to carry the cut grain onto a traveling apron or endless conveyor 11 which is also supported on the supporting structure 6. The supporting structure, apron and cutter bar are inclined downwardly and forwardly at a relatively wide angle to the ground surface, as shown in Fig. 1. The supporting structure has a swinging movement whereby the cutter bar may be moved upwardly to an inoperative position at a smaller angle to the ground, as shown in Fig. 2. The pick-up device is designed for use with such a combine and comprises two main elements, a supporting member or bracket 12 and a pick-up member 13 which is pivotally supported near its rear end on the forward portion of the supporting member.

In the arrangement illustrated the supporting member is in the form of an elongate bar or bracket having at its rear end means for securing the same to the cutter bar 10 of the combine. As here shown, the rear end portion 14 of the bracket is arranged beneath and substantially parallel with the cutter bar and is rigidly secured thereto by a bolt or bolts 15. The intermediate portion 16 of the bracket extends forwardly from the rear portion 14 thereof at a slight angle so that it has less inclination with relation to the ground than has the rear portion 14. Means are provided for pivotally connecting the forward end portion 17 of the supporting bracket with the pick-up member 13 and for controlling its movement with relation thereto, as will be hereinafter described.

The pick-up member, or shoe, comprises a vertical web 18 provided at its upper edge with laterally extending flanges 19, and having the forward portion of its lower edge provided with laterally extending flanges 20. The lower rear portion of the web is cut away and the adjacent edge portion of the web has secured thereto vertical side walls 21 spaced apart laterally to provide between them a recess 22 into which the forward end portion 17 of the supporting bracket extends and in which it is mounted on a pivot pin 23 supported in the side walls 22. The forward end portion 17 of the supporting bracket is preferably inclined upwardly and forwardly and the pivot pin 23 is so arranged with relation to the recess 22 that the pick-up member may have a relatively large range of movement, with relation to the supporting bracket, about its pivotal axis. The side walls 21 which form the recess are of a height somewhat less than the height of the web 18 and the upper flange portion of the web extends rearwardly a short distance beyond the recess 22 but is so spaced from the supporting bracket and from the cutter bar as to permit of a large pivotal movement of the pick-up member. Spring means are provided for moving the pick-up member in one direction about its pivotal axis and for yieldably resisting its movement in the other direction. In the arrangement here shown a coiled spring 24 is confined between the supporting bracket and the top wall 25 of the recess 22. In the present instance the supporting bracket has a longitudinal channel 26. The lower end of the spring 24 is mounted on a stud 27 on the bottom of the channel and the upper end of the spring is mounted on a stud 28 on the top wall 25 of the recess, which stud is spaced slightly to the rear of the pivotal axis 23 so that the spring tends to move the forward end of the pick-up member downwardly with relation to the bracket. Means are provided for limiting the pivotal movement of the pick-up member under the influence of the spring and, in the present instance, the recess is provided with a bottom wall 29 the rear edge of which is arranged to engage the supporting bracket and form a stop to limit the downward movement of the pick-up member with relation to the bracket. This bottom wall 29 is arranged to form a ground engaging surface beneath the pivotal axis of the pick-up member, and due to the spacing of the side walls 21 that ground engaging surface is of a width somewhat greater than the width of the flanged lower portion 20 of the pick-up member. The lower surface of the pick-up member is preferably curved upwardly in advance of the ground engaging surface 29, and then downwardly to form a forward ground engaging surface 31, and a relatively short portion 32 of the lower surface slopes upwardly and forwardly from the ground engaging part 31. The shape of this lower surface of the pick-up member is such that the forward ground engaging surface 31 is of small area and may be pressed into soft ground or turf by the action of the spring 24, as shown in Fig. 1.

The upper surface of the pick-up member, formed by the flanges 19, has a relatively short forward portion 33 which is inclined downwardly and forwardly so that the two other surfaces 32 and 33 converge substantially to a point to form a tapered nose, the point of which is here shown as slightly above the longitudinal center of the pick-up member. When the pick-up member is in operative engagement with the ground and the forward ground engaging surface 31 is pressed into the ground or turf the point of the nose will lie close to but out of engagement with the ground so that the inclined lower surface 32 will engage uneven ground surfaces, stones or other obstructions, and will elevate the forward end of the pick-up member to enable it to ride over such obstructions. The upper surface of the pick-up member extends rearwardly from the inclined forward surface 33 thereof at slight inclination to the horizontal, the arrangement being such that the inclined forward portion of said upper surface will impart to the grain the major portion of the lifting movement which is necessary to enable the grain to be delivered above the cutter bar and the slightly sloping rear portion of this upper surface will have little tendency to displace the grain as the pick-up member moves forwardly beneath the same.

While the pick-up device will operate very efficiently in the gathering of uncut grain which has fallen, that is, which has been beaten down by wind and rain, it is particularly useful in the gathering of dry grain from the swath and the operation will be here described in connection with that use. It will be understood of course that the cutter bar is provided with a series of pick-up devices spaced suitable distances one from the other, as shown in Fig. 5. When the cutter bar 10 is in its inoperative position, as shown in Fig. 2, the pick-up device will be supported out of engagement with the ground and the spring will move the pick-up member about its pivotal axis to the limit of its downward movement, that is, until the bottom wall 29 engages the supporting bracket. As the cutter bar moves downwardly toward its normal operating position, as shown in Fig. 1, the forward ground engaging surface 31 of the pick-up member will engage the ground and the continued downward movement of the cutter bar and supporting bracket will cause the pick-up member to move about its pivotal axis until the rear ground engaging surface 29 has engaged the ground, at which time the cutter bar will be substantially in its operating position and the spring 24 will be partially compressed so as to press the ground engaging surface 31 into the ground or turf as the machine advances. The forward movement of the machine will cause the tapered forward end or nose of the pick-up member to move beneath the swath of grain which is to be elevated and the short sharply inclined forward portion of the upper surface of the pick-up member will quickly elevate the grain the major portion of the required distance, as above mentioned. This lifting of the grain takes place while the grain is still in the swath and the forward movement or displacement thereof by the pick-up member is resisted by the mass of grain in the swath and by stubble in the field, this resistance being sufficient to permit the nose of the pick-up member to pass beneath the grain without material forward displacement of the latter. As the pick-up member continues to move forwardly the partially elevated grain will move onto the slightly inclined upper surface of the pick-up member which has little tendency to impart forward movement or displacement to the grain, so that the smaller resistance offered by the forward portion of the elevated grain will be sufficient to prevent any appreciable forward movement of the grain by the pick-up member. The pick-up member will thus move forwardly beneath the grain and when the rear end of the pick-up member passes from beneath the grain the latter will drop onto the cutter bar and the cutter bar will move beneath the same so that the grain will be delivered onto the conveyor 11. During this operation the spring 24 is under partial compression to hold the forward end of the pick-up member firmly in engagement with the ground so that it will pick up all the grain but is capable of further compression to permit the elevation of the forward end of the pick-up member should the latter encounter an obstruction. The rear end of the upper portion of the pick-up member is so spaced with relation to the supporting bracket and cutter bar that the pick-up member is capable of a relatively large upward movement about its pivotal axis from its normal ground engaging position. The continuous web between the upper and lower edges of the pick-up member prevents coarse grain or other coarse material which may be in the swath, from lodging in the pick-up member and interfering with its proper operation. It is immaterial whether or not the cutting element or sickle of the combine operates while the grain is being gathered from the swath but usually it is permitted to operate.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. A pick-up device for a harvester comprising a supporting member having means for rigidly connecting the same with a downwardly and forwardly inclined cutter bar and having a part arranged to extend forwardly and downwardly from said cutter bar, a pick-up member pivotally mounted near its rear end on the forward portion of said supporting member, and spring means tending to move the forward end of said pick-up member downwardly with relation to said supporting member, the lower surface of said pick-up member having a ground engaging portion near the rear end thereof, a second ground engaging portion near the forward end thereof, and a forward portion extending upwardly and forwardly from said second ground engaging portion, and the upper surface of said pick-up member having a relatively short forward portion extending downwardly and forwardly at a substantial inclination, said upper surface extending rearwardly from said forward portion thereof at a relatively small inclination to a point a short distance beyond the pivotal axis of said pick-up member.

2. A pick up device for attachment to a harvester to pick up cut grain from the swath comprising a supporting member having means for securing the same to a cutter bar, a pick up member pivotally mounted near its rear end on said supporting member and extending forwardly therefrom, and spring means tending to move the forward portion of said pick up member downwardly with relation to said supporting member, the lower surface of said pick up member having a ground engaging portion spaced rearwardly a relatively short distance from the forward end thereof and an end portion extending upwardly and forwardly from said ground engaging portion, and the upper surface of said pick up member having a relatively short forward end portion extending upwardly and rearwardly at a substantial inclination to the ground level to lift cut grain from the swath and deliver the same to the rear portion of said upper surface while the adjacent portion of said swath is in engagement with the ground and stubble, said rear portion of said upper surface extending upwardly and rearwardly at a relatively small inclination which has little tendency to displace the grain as said surface moves beneath the same.

HARRY A. HALL.